United States Patent

Maeda et al.

[15] 3,641,409
[45] Feb. 8, 1972

[54] CONTROL SYSTEM FOR DC MOTOR

[72] Inventors: Yutaka Maeda; Kinya Hirata, both of Aichi-ken, Japan

[73] Assignee: Okuma Machinery Works Ltd., Nagoya, Japan

[22] Filed: Oct. 8, 1969

[21] Appl. No.: 864,629

[30] Foreign Application Priority Data

May 23, 1969 Japan..................................44/40374

[52] U.S. Cl..............................318/258, 318/280, 318/293, 318/343

[51] Int. Cl..........................................................H02r 5/06

[58] Field of Search..................318/258, 280, 293, 341, 343; 321/44

[56] References Cited

UNITED STATES PATENTS 3,372,327    3/1968    Morgan ....................................321/44

*Primary Examiner*—Bernard A. Gilheany
*Assistant Examiner*—W. E. Duncanson, Jr.
*Attorney*—Waters, Roditi, Schwartz & Nissen

[57] ABSTRACT

A control system for controlling a DC motor by controlling the conduction angle of controllable electric valves, wherein in order to discharge energy stored in a choke coil connected in series with the armature of the DC motor, the controllable electric valves including rectifiers are connected in parallel with the series circuit of the DC motor and choke coil for the control of unidirectional rotation, and a reverse parallel circuit consisting of controllable electric valves is connected in parallel with said series circuit for the reversible control.

4 Claims, 26 Drawing Figures

FIG. 4a  AC INPUT
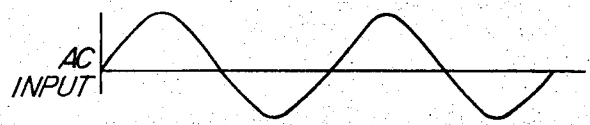
FIG. 4b  SCR1 GATE INPUT
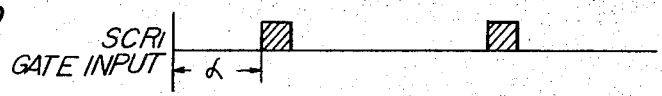
FIG. 4c  SCR2 GATE INPUT
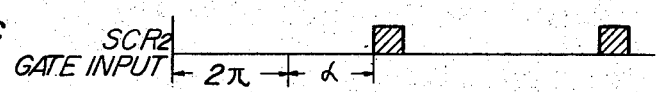
FIG. 4d  SCR1 CURRENT
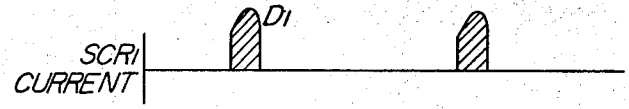
FIG. 4e  SCR2 CURRENT
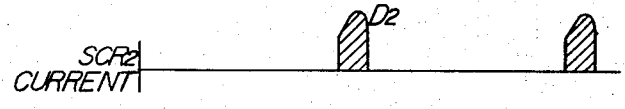
FIG. 4f  E2 SCR5 GATE INPUT
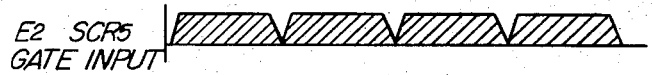
FIG. 4g  E1 SCR5 GATE INPUT
FIG. 4h  SCR5 CURRENT
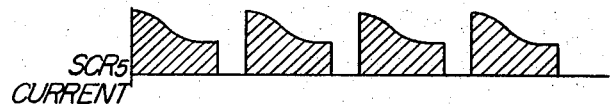
FIG. 4i  ARMATURE CURRENT
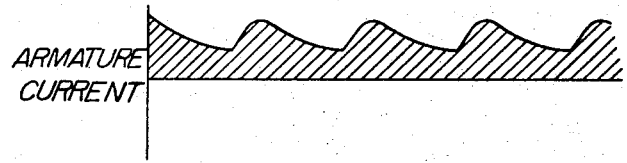

CONTROL SYSTEM FOR DC MOTOR

BACKGROUND OF THE INVENTION

1. Field of the Invention

This invention relates to a system for controlling the driving of a DC motor wherein there is provided a bypass means for discharging electrical induction energy stored in a choke coil connected in series with the armature of the DC motor through the armature, thereby making an armature current continuous to enhance the efficiency of the DC motor and make it possible for smooth operation.

2. Description of the Prior Art

When a DC motor is driven by means of a conventional control circuit using controllable electric valves such as thyristors or the like (referred to simply as thyristors hereinafter), the armature current turns out to be an intermittent narrow pulselike one. Therefore, it is disadvantageous in that the efficiency thereof is poor. A further disadvantage is that variations in synchronism with the power source frequency tend to occur at the motor shaft due to the low form factor of the armature current.

SUMMARY OF THE INVENTION

This invention is intended to provide a drive system which is capable of overcoming the drawbacks of the conventional apparatus, wherein in order to discharge energy stored in a choke coil connected in series with the armature of the DC motor, the controllable electric valves including rectifiers are connected in parallel with the series circuit of the DC motor and choke coil for the control of unidirectional rotation, and a reverse parallel circuit consisting of controllable electric valves is connected in parallel with the series circuit for the reversible control.

It is an object of the present invention to improve the form factor (effective value/mean value) by making the form of an armature current continuous, thereby enhancing the utilization rate of a motor.

In accordance with the present invention, by flowing energy temporarily stored in the choke coil through the armature via a discharging thyristor during nonconduction of a phase shift controlling thyristor, the armature current is made to be continuous to decrease the pulsation thereof so that loss can be reduced and the form factor can be improved as compared with the conventional apparatus, thus greatly enhancing the efficiency. Furthermore, a small type of motor may be employed to provide an equal output sufficient to cope with a rise in the utilization rate of the motor, and the input power source capacitance can be decreased. Still furthermore, there is no possibility that undesirable vibrations are caused, so that smooth operation can be achieved.

BRIEF DESCRIPTION OF THE DRAWINGS

FIGS. 4a to 4i are are views showing the voltage and current waveforms occurring in the main portions of the circuit shown in FIG. 2;

Referring to FIG. 1, there is shown the conventional control circuit wherein an AC input AC is supplied across the primary winding of a transformer T provided with a center tap so that a current is caused to flow through a choke coil L and armature M to rotate the armature M in a predetermined direction (for example, in the forward direction) by alternately rendering thyristors $SCR_1$ and $SCR_2$ connected with the secondary side of the transformer by gate pulses. By alternately triggering thyristors $SCR_3$ and $SCR_4$, on the other hand, the current is now caused to flow in the opposite direction through the armature M so that the motor is driven in the reverse direction. The pulse width of the armature current depends upon the conduction period of the thyristors and inductance of the choke coil. Thus, by changing the phase angle of the gate pulses imparted to the thyristor with respect to the power source voltage, it is possible to change the average value of the armature current. Generally, however, the armature current is intermittent.

Referring now to FIG. 2, there is shown an embodiment of the present invention wherein thyristors $SCR_5$ and $SCR_6$ are connected across the series circuit of the armature M and choke coil L shown in FIG. 1 in opposite and parallel relationship to each other. Referring to the waveforms shown in FIGS. 4a to 4i, description will first be made of the mode of operation wherein the thyristors $SCR_1$ and $SCR_2$ are rendered conductive to rotate the motor in the forward direction, for the sake of simplicity. By rendering the thyristor $SCR_1$ conductive by imparting a gate pulse to the gate thereof with a phase shift angle $\alpha$ with respect to a half-cycle portion of the AC input which is positive with respect to points A and B in FIG. 2 as shown in FIGS. 4a and 4b, a current is made to flow through the point A—$SCR_1$—point D—choke coil L—point E—armature M—center tap C—point A (FIG. 2). It is to be noted that the circuit is so designed that such a gate pulse as shown in FIGS. 4f or 4g is always imparted to the gate of the thyristor $SCR_5$ while the motor is rotating in the forward direction. At this point, therefore, the thyristor $SCR_5$ becomes equivalent to a diode. When a potential at the point A (that at the point D) becomes lower than that at the point C, the thyristor $SCR_5$ which has become equivalent to a diode as described above is rendered conductive so that the difference between the potential at the point C and that at the point D becomes zero with a result that the thyristor $SCR_1$ is turned off. Thereupon, energy stored in the choke coil L is discharged from the point E through the armature E—$SCR_5$—point D, thus resulting in a armature driving current flow. The period of this discharge can be freely selected by changing the inductance of the choke coil L. At this point, the polarity of the AC input is reversed to be in a half-cycle portion higher than the potentials at the point B and C. Therefore, when a gate pulse is imparted the thyristor $SCR_2$ with a phase shift angle $\alpha$ as shown in FIG. 4c, the thyristor $SCR_2$ is turned on so that the potential at the point D becomes higher than that at the point C so that the thyristor $SCR_5$ is turned off. Thus, a current is made to flow through the point B—$SCR_2$—point D—choke coil L—point E—armature M—point C to drive the motor. At this time, energy is stored in the choke coil L in the form of magnetic field energy. Subsequently, when a half-cycle portion of the AC input where the potential at the point C becomes positive with respect to that at the point B is reached, the thyristor $SCR_5$ is again turned on while the thyristor $SCR_2$ is turned off, so that a discharge current resulting from the energy stored in the choke coil L is made to flow through the armature M. Thus, after the lapse of a period of time corresponding to the phase shift angle $\alpha$, the thyristor $SCR_1$ is turned off, so that a current available from the transformer is made to flow through the armature M via the thyristor $SCR_1$. Repetition of the foregoing operation causes the motor to rotate in the predetermined direction (forward direction).

As will be seen from the foregoing, by providing a relatively high inductance value for the choke coil L and suitably selecting the period of discharge of the energy stored in the choke coil L, it is possible to fill the intervals between pulselike currents $D_1$ and $D_2$ which are alternately supplied to the armature M through the thyristors $SCR_1$ and $SCR_2$ as shown in FIGS. 4d and 4e with a current (FIG. 4h) (resulting from the energy stored in the choke coil L) which is discharged through the thyristor $SCR_5$. Thus, the armature current becomes continuous as shown in FIG. 4i so that the pulsation thereof is decreased. In an attempt to rotate the motor in the reverse direction, the gate pulse (input) is always imparted to the thyristor $SCR_6$ while such gate pulse is alternately supplied to the gates of the thyristors $SCR_3$ and $SCR_4$ with a phase shift angle $\alpha$ maintained therebetween to thereby render these thyristors conductive in such a manner as to cause a reverse drive current to flow through the armature M.

Figure 3A:
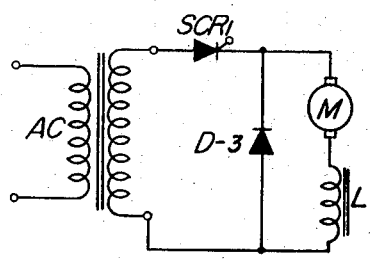
FIG. 3a to 3f are circuit diagrams showing other embodiments of the present invention respectively.
Figure 2:
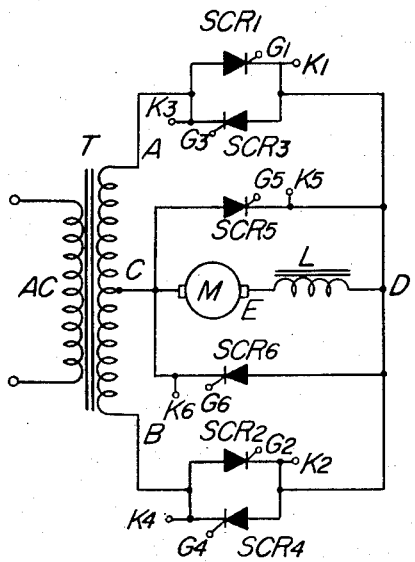
FIG. 2 is a circuit diagram showing an embodiment of the present invention as applied to the circuit of FIG. 1.

FIGS. 3a to 3f show embodiments different from that of FIG. 2 respectively. Referring to FIG. 3a, there is shown a single-phase, half-wave type control circuit for flowing only a unidirectional current through the armature M, wherein a diode (rectifier) D-3 is employed in place of the thyristor $SCR_5$ of FIG. 2 as the element constituting a bypass for permitting energy stored in the choke coil L to be discharged through the armature 18.

Figure 3B:
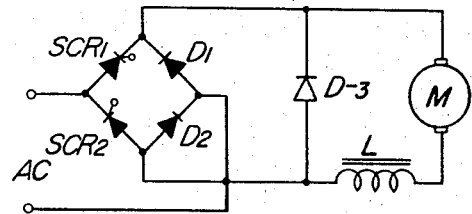
Figure 3C:
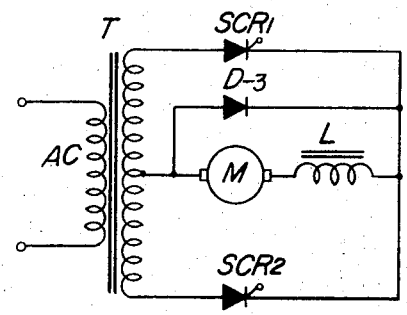

FIGS. 3b and 3c show single-phase, full-wave type control circuits for flowing only a unidirectional current through the armature M, wherein the diode D-3 is also employed as the element for permitting of the discharge of the aforementioned stored energy.

Figure 3D:
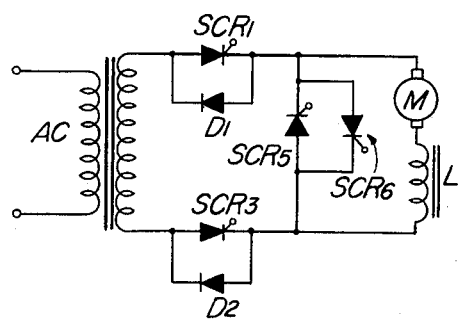
Figure 3E:
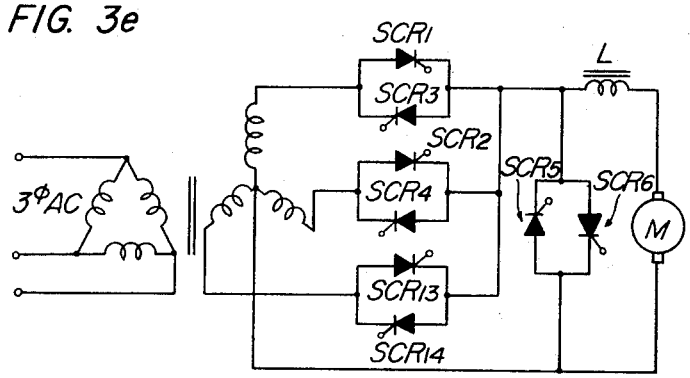
Figure 3F:
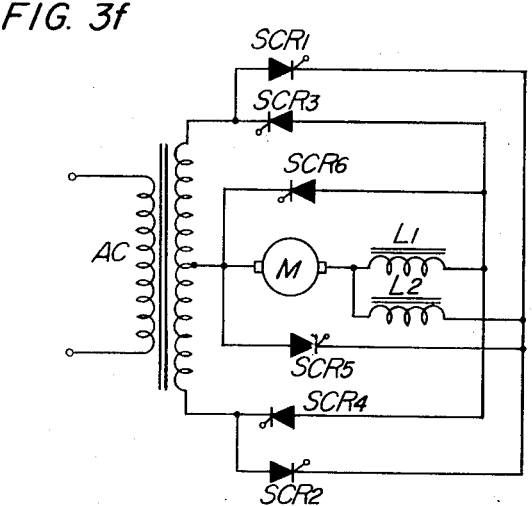

FIG. 3d shows a single-phase, half-wave type reversible control circuit, and FIG. 3e shows a three-phase, half-wave type reversible control circuit. FIG. 3f shows a single-phase, full-wave type reversible control circuit which corresponds to a slightly modified form of the embodiment shown in FIG. 2, wherein separate choke coils $L_1$ and $L_2$ are employed during the forward rotation and during the reverse rotation respectively so as to decrease the capacitance of the choke coil, while at the same time reducing the short-circuit current by dividing the same.

Figure 5:
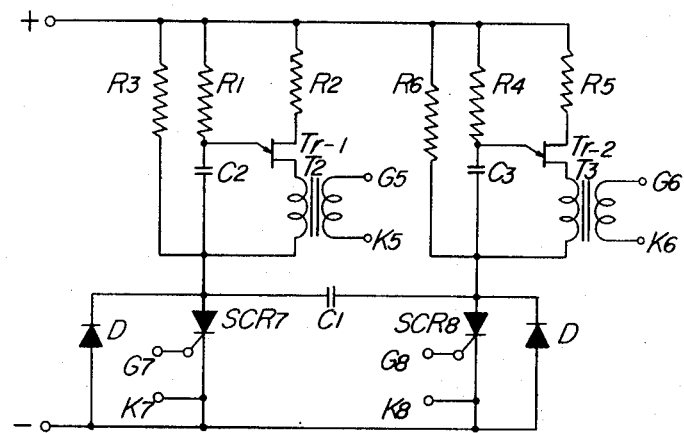
FIGS. 5 and 6 are views showing examples of the gate pulse generating circuit for controlling the circuit shown in FIG. 2, respectively.
Figure 6:
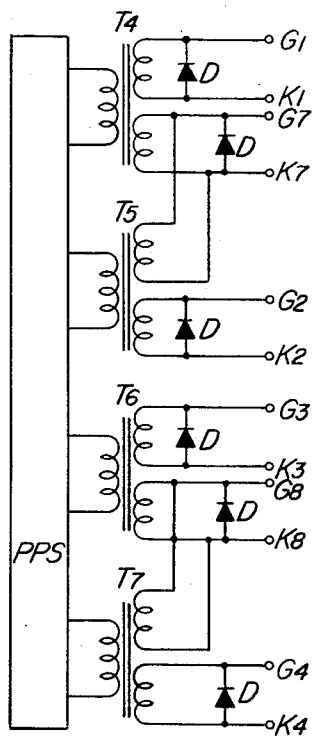

In the embodiment of FIG. 2, phase shift control thyristor and discharging thyristor are further controlled by gate pulses generated by circuits shown in FIGS. 5 and 6. In the drawings, the gate $G_i$ and cathode $K_i$ of each thyristor is connected with the corresponding output terminals $G_i$ and $K_i$ respectively.

Referring to FIG. 5, there is shown a flip-flop circuit using two thyristors $SCR_7$ and $SCR_8$, wherein the pulse-generating circuit constitutes a load therefore. A conventional reversible phase shifter circuit is provided for providing inputs to the primary windings of pulse transformers $T_4$ and $T_5$ so that such gate pulses as shown in FIGS. 4b and 4c are available across terminals $K_1$ and $G_1$ and across terminals $K_2$ and $G_2$ respectively. As shown in FIG. 6, the pulse transformers $T_4$ and $T_5$ are provided with additional secondary windings which are connected in common across terminals $K_7$ and $G_7$, so that an output is available across the terminals $K_7$ and $G_7$ whenever a pulse input is imparted to the pulse transformer $T_4$ or $T_5$. Since the terminals $K_7$ and $G_7$ are connected with the cathode $K_7$ and gate $G_7$ of one of the thyristors, $SCR_7$, which constitute the flip-flop of FIG. 5 respectively, this thyristor $SCR_7$ of FIG. 5 is also turned on when pulse inputs are imparted to the pulse transformers $T_4$ and $T_5$ to render the thyristors $SCR_1$ and $SCR_2$ conductive. Thus, a unijunction transistor $T_{r-1}$ is made to produce oscillation at a constant frequency depending upon the values of the resistor $R_1$ and capacitor $C_2$, so that a pulse signal having a frequency equal to said constant frequency occurs in the pulse transformer $T_2$. Thus, by connecting terminals $K_5$ and $G_5$ of the secondary winding of the transformer $T_2$ with the cathode $K_5$ and gate $G_5$ of the thyristor $SCR_5$ of FIG. 2 respectively, it is possible that the thyristor $SCR_5$ is turned on to discharge stored energy substantially simultaneously when the thyristor $SCR_1$ or $SCR_2$ is turned off, due to the fact that a repetition pulse input having a frequency equal to the constant frequency such as shown at $E_1$ in FIG. 4g is always imparted to the gate of the thyristor $SCR_5$ until the flip-flop of FIG. 5 is switched.

In an attempt to reverse the electric motor, the thyristors $SCR_3$ and $SCR_4$ of FIG. 2 are alternately turned on through pulse transformers $T_6$ and $T_7$ of FIG. 6 in accordance with instruction for reversal from the reversible phase shifter circuit (not shown) as a result of the operation similar to that for forward rotation described above. At the same time, a pulse occurring across terminals $K_8$ and $G_8$ with which the secondary windings of the pulse transformers $T_6$ and $T_7$ are connected in common as shown in FIG. 6 is imparted to the gate of the other thyristor $SCR_8$ of FIG. 5. As a result, the thyristor $SCR_8$ is turned on while the thyristor $SCR_7$ is turned off with the aid of a commutation capacitor $C_1$, so that the operation of the flip-flop circuit is reversed. Thus, the unijunction transistor $T_{r-1}$ is stopped from oscillation, and $T_{r-2}$ is made to start oscillation. Consequently, a gate pulse resulting from the oscillation of the unijunction transistor $T_{r-2}$ is imparted to the gate of the thyristor $SCR_6$ of FIG. 6 so that the energy stored in the choke coil L is discharged through the thyristor $SCR_6$.

Figure 7:
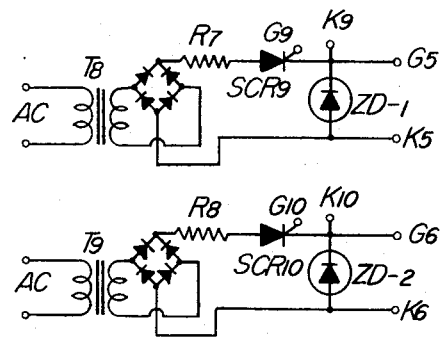
FIGS. 7 and 8 are views showing other examples of the gate pulse generating circuit respectively.

In the foregoing, the gate pulse (input) to turn on the thyristors $SCR_5$ and $SCR_6$ was described as repetitive pulse signal having a constant frequency because it was obtained from an oscillator circuit using unijunction transistors inserted in the flip-flop circuit of FIG. 5 as a load. However, it is also possible that the secondary windings of transformers $T_8$ and $T_9$ to which an AC input AC is imparted as a power source are connected at one end with the anodes of thyristors $SCR_9$ and $SCR_{10}$ through resistors $R_7$ and $R_8$ respectively and at the other end with one terminal of each of Zener diodes ZD-1 and ZD-2, that the cathodes of the thyristors $SCR_9$ and $SCR_{10}$ are connected with the Zener diodes ZD-1 and ZD-2 respectively, and that output terminals $K_5$, $G_5$ and $K_6$, $G_6$ of the secondary windings of the pulse transformers $T_2$ and $T_3$ shown in FIG. 5 are connected with the cathodes and gates $K_9$, $G_9$ and $K_{10}$, $G_{10}$ of the respective thyristors, as shown in FIG. 7. With such an arrangement, for an instruction to rotate the motor in the forward direction for example, a pulse resulting from the oscillation of the unijunction transistor $T_{r-1}$ is applied to turn on the thyristor $SCR_9$ so that a gate input signal having a large width is obtained across the opposite terminals $K_5$ and $G_5$ of the Zener diode ZD-1. Thus, by connecting these terminals $K_5$ and $G_5$ with the cathode and gate of the thyristor $SCR_5$ shown in FIG. 2, it is possible to always give such a gate input as shown at $E_2$ in FIG. 4f to the gate of the thyristor $SCR_5$ during the forward rotation. In this way, the intended purpose can be achieved. During the reverse rotation, on the other hand, the thyristor $SCR_{10}$ of FIG. 7 is turned on so that an input is imparted to the gate of the thyristor $SCR_6$ of FIG. 2.

Figure 8:
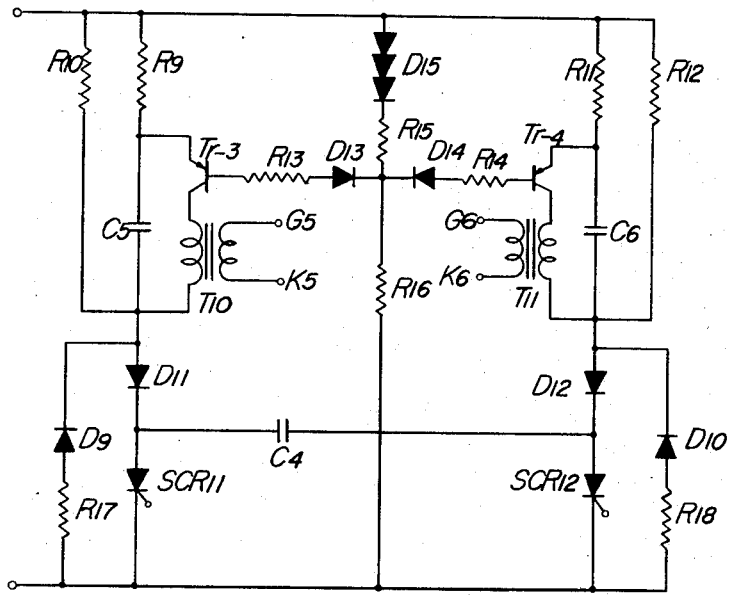

Referring to FIG. 8, there is shown a flip-flop circuit using thyristors wherein a conventional transistor oscillator is used as a load. This flip-flop circuit corresponds to a modified form of the circuit shown in FIG. 5, and it is adapted to operate in the same manner as the latter. In this circuit, diodes $D_{11}$ and $D_{12}$ are connected in series with thyristors $SCR_{11}$ and $SCR_{12}$ respectively, and a commutation capacitor $C_4$ is connected between the connection points so that a voltage charged at the capacitor $C_4$ is maintained at a high value by virtue of the actions of the diodes $D_{11}$ and $D_{12}$, thus resulting in stabilized operation.

Figure 1:
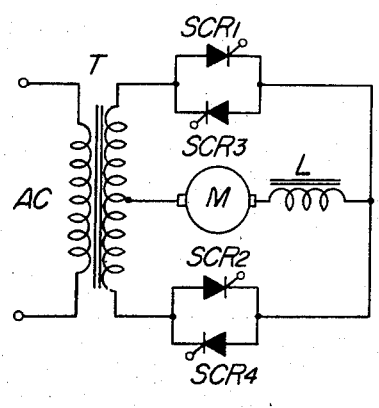
FIG. 1 is a circuit diagram showing the conventional single-phase center-tap type control circuit for reversibly driving a DC motor.
Figure 9A:
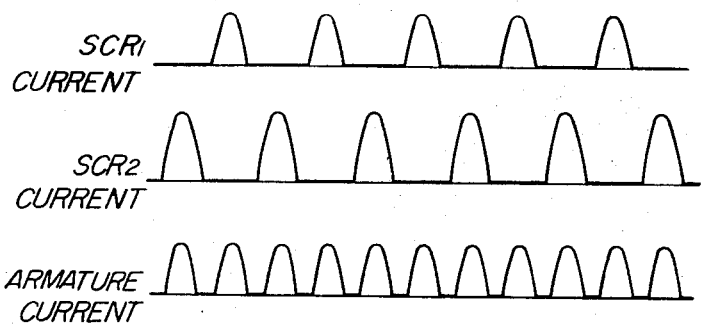
FIGS. 9a and 9b are waveforms illustrating actual experimental results respectively.
Figure 9B:
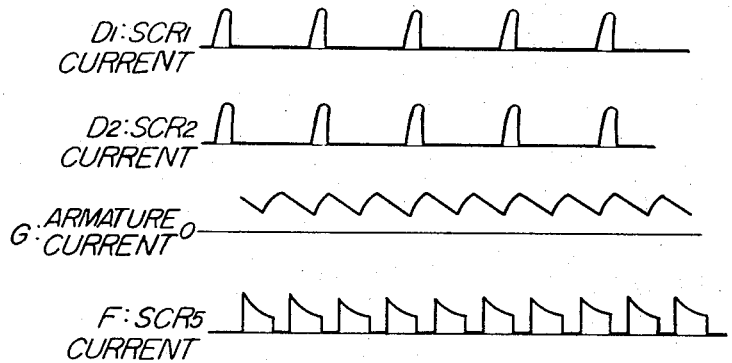

FIGS. 9a and 9b show the results of tests performed by driving a Minertia motor Model 25EM which is a DC motor manufactured by Yasukawa Electric of Japan by means of the conventional drive system shown in FIG. 1 and the drive system of the present invention shown in FIG. 2 respectively. The conditions for the tests were such that the inductance of the choke coil was 25 mh., the number of revolutions of the motor 500 r.p.m., and the mean value of the armature current 5 a. Under such conditions, the effective value of the armature current were 7.5 a. in the case of the conventional circuit shown in FIG. 1, and in the case of the circuit of the present invention shown in FIG. 2, it was improved to be 5.5 a. Comparison of the armature current waveform shown in FIG. 9a with that according to the present invention shown in FIG. 9b evidently shows that the present invention is far more effective than the prior art.

Figure 10:
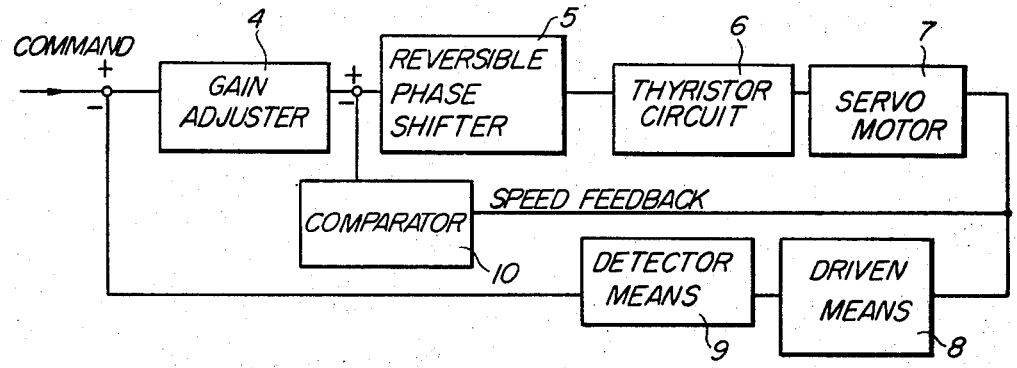
FIG. 10 is a block diagram showing a servosystem wherein the DC motor which is driven by the apparatus of this invention is used as a servomotor.

FIG. 10 is a block diagram showing a servosystem in which a DC motor driven by the drive system of the present invention is used as a servomotor. In this arrangement, the output of a gain adjuster to which an instruction value is imparted is supplied to a reversible phase shifter circuit 5, a gate pulse available from the reversible phase shifter circuit is applied to the gates of the thyristors of the thyristor circuit 6 which may be constituted by such a control circuit as shown in FIG. 2 for example to thereby drive a servomotor 7 so as to displace a member to be driven 8, thus detecting the motion of the member 8 by means of a detecting means 9. Furthermore, speed feedback is provided from the motor 7 to the input side of the reversible phase shifter circuit 5 through a comparator 10 so as to be added to the output of the aforementioned gain adjuster in an opposite direction. Thus a negative feedback loop is established. Still furthermore, feedback is provided from the detecting means 9 to the input side of the gain adjuster 4. Other circuits which are not specifically explained herein may be equivalent in operation and effect to the conventional circuits. The reversible phase shifter circuit 5 and thyristor circuit 6 are so designed that when the input to the reversible phase shifter circuit is positive, a gate pulse is imparted to the thyristor circuit in such a manner as to rotate the motor 7 in the forward direction while when the input to the reversible phase shifter circuit is negative, a gate pulse is imparted to the thyristor circuit in such a manner as to rotate the motor 7 in the reverse direction. Description will now be made of the operation of the thyristor circuit 6 with respect to the same conditions as those of the circuit shown in FIG. 2 described above.

Figure 11A:
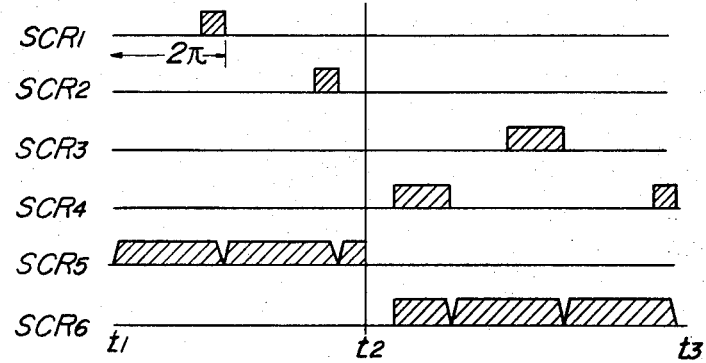
FIGS. 11a and 11h are views showing waveforms occurring in various portions useful for explaining the operation of the system shown in FIG. 10.
Figure 11B:
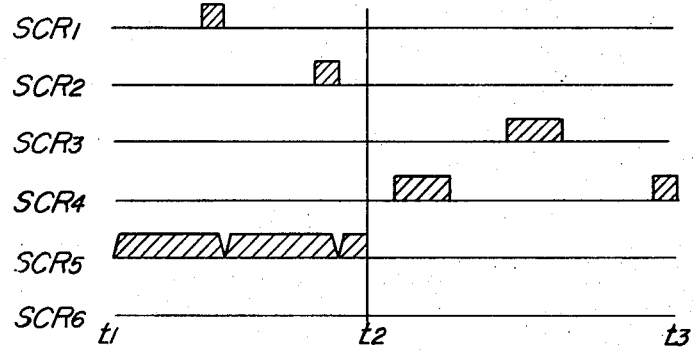

First, if an instruction for forward rotation is given by the setter 4 which has received a command, then the thyristors $SCR_1$, $SCR_2$ and $SCR_5$ are rendered conductive as in the case of the operation for forward rotation described above in connection with FIG. 2. Gate pulses imparted to the respective thyristors are as shown in FIG. 11a. In this figure, the interval between points of time $t_1$ and $t_2$ correspond to the forward rotation period. Assume that the instruction by the setter is changed to the one for stop for example at the point of time $t_2$. In this case, a negative input is imparted to the reversible phase shifter due to the speed feedback as long as the motor is undergoing rotation due to inertia. Therefore, after the point of time $t_2$, gate pulses are imparted to the thyristors $SCR_3$, $SCR_4$ and $SCR_6$ so that a reverse driving current flows through the motor to brake the latter, so that the motor will be stopped at a point of time $t_3$, as shown in FIG. 11a. FIG. 11b shows waveforms which occur in the case where the circuit is designed so as to operate in a mode of operation different from that for the waveforms shown in FIG. 11a. In this case, a gate input is imparted to bypass thyristors $SCR_5$ and $SCR_6$ when instruction signals for forward and reverse rotations are provided by the setter, the gate input to the thyristors $SCR_5$ and $SCR_6$ becomes extinct when the output of the setter becomes zero, and the bypass thyristor for discharging energy stored in the choke coil L is stopped from operation only during the reverse rotation and braking operation. That is, the waveforms shown in FIG. 11b are those which occur when the present system operates in the same manner as the conventional one. By selectively employing these modes of operation shown in FIGS. 11a and 11b, it is possible to drive the DC motor incorporated in an automatic control system. Thus, a stabilized servosystem can be constructed. It goes without saying that in this invention, as grid-controlled electric valves, use may be made of not only semiconductor elements such as thyristors, diodes or the like but also mercury-arc rectifiers, thyratrons or the like.

We claim:

1. In a speed control system for a DC motor being supplied with AC power comprising an armature rectifying means to convert the AC power to DC power by energizing the rectifying means at a conduction angle to produce DC power having a selected polarity, and means for determining the polarity of said DC power and changing the conduction angle, the improvement comprising a choke coil connected between said rectifying means and said armature of said DC motor, a discharging circuit including a pair of controlled rectifiers connected in parallel and in opposite conducting directions, said discharging circuit being connected in parallel across said armature and said choke coil, and means for controlling said discharging circuit to selectively make one of said controlled rectifiers conductive in accordance with the direction of rotation of said DC motor.

2. A speed control system according to claim 1, comprising means for generating a repetitive gate signal while said motor rotates in one direction, said repetitive gate signal being applied to a gate electrode of one of said pair of controlled rectifiers corresponding to said direction of rotation.

3. A speed control system according to claim 1, wherein said means for controlling said discharging includes a flip-flop having two stages, a pair of trigger circuits for producing a gate signal to make respective ones of said pair of controlled rectifiers conductive, each stage of said two stages having a trigger terminal and being connected to a respective one of said pair of trigger circuits, and one of said trigger circuits being selectively supplied with a trigger signal in phase with a signal produced by said means for controlling the conduction angle of said rectifying means.

4. A speed control system according to claim 3, wherein said trigger circuit comprises a pulse generating circuit for producing a pulse signal from the corresponding stage of said flip-flop, and a constant voltage rectifying circuit for producing said gate signal to make corresponding controlled rectifier conductive.

* * * * *